Figure 1:
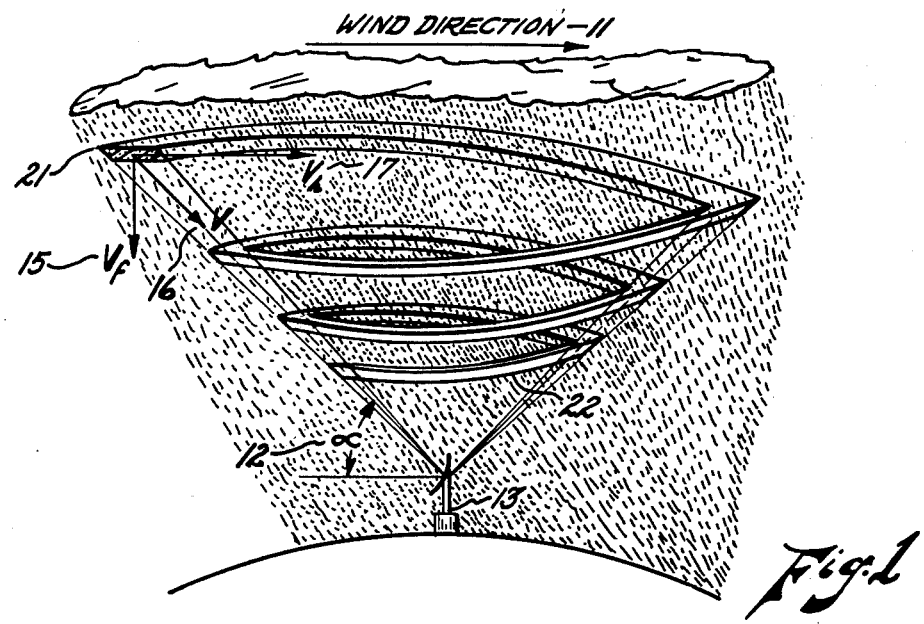

July 27, 1965 R. M. LHERMITTE 3,197,768
METHOD AND MEANS OF DETERMINING VARIABILITY OF ATMOSPHERIC
MOTION WITH RESPECT TO ALTITUDE
Filed July 5, 1963 3 Sheets-Sheet 1

INVENTOR.
ROGER M. LHERMITTE
BY
ATTORNEYS

July 27, 1965

R. M. LHERMITTE 3,197,768

METHOD AND MEANS OF DETERMINING VARIABILITY OF ATMOSPHERIC
MOTION WITH RESPECT TO ALTITUDE

Filed July 5, 1963

3 Sheets-Sheet 2

INVENTOR.
ROGER M. LHERMITTE

BY

ATTORNEYS

July 27, 1965  R. M. LHERMITTE  3,197,768
METHOD AND MEANS OF DETERMINING VARIABILITY OF ATMOSPHERIC MOTION WITH RESPECT TO ALTITUDE
Filed July 5, 1963  3 Sheets-Sheet 3

INVENTOR.
ROGER M. LHERMITTE
BY
ATTORNEYS

United States Patent Office 3,197,768
Patented July 27, 1965

3,197,768
METHOD AND MEANS OF DETERMINING VARIABILITY OF ATMOSPHERIC MOTION WITH RESPECT TO ALTITUDE
Roger M. Lhermitte, Sudbury, Mass., assignor to the United States of America as represented by the Secretary of the Air Force
Filed July 5, 1963, Ser. No. 293,212
6 Claims. (Cl. 343—5)
(Granted under Title 35, U.S. Code (1952), sec. 266)

The invention described herein may be manufactured and used by or for the United States Government for governmental purposes without payment to me of any royalty thereon.

This invention relates to mapping wind variability, and more particularly to its recordation at varying altitudes.

Copending applications: "Atmospheric Motion Coherent Pulse Doppler Radar System," application Number 263,081, filed March 5, 1963, and "Atmospheric Motion Noncoherent Pulse Doppler Radar System," application Number 263,082, filed March 5, 1963, describe methods and means of determining atmospheric motion at any preselected altitude. Their operation is described in subsequent paragraphs.

These systems measure horizontal and vertical motion of detectable particles in widespread rain or snow conditions by pulse Doppler radar. These systems presuppose that wind at each altitude is uniform over a radius of a few miles, and that the spectrum of particle fall velocities is essentially invariant over this area. With these assumptions, horizontal wind velocities and particle fall velocities, as determined from the Doppler frequency shift measured at different azimuths keeping the elevation angle of the radar antenna constant.

A particular range interval corresponding to a distance R from the radar is achieved by gating the echos returned by the particles of moisture struck by the energy radiated by the radar; the Doppler shift of this signal is analyzed and radial speed of the particles with respect to the radar measured. By rotating the beam continuously in azimuth radial speed at a constant altitude determined by the product of R, the preselected range and the sine of the fixed angle of elevation is displayed as a continuous function of azimuth.

The radar reproduces the Doppler shift frequency in an absolute value. The patterns that will be displayed will show two maxima, obtained when the radar is either coincident with or opposite to the wind vector azimuth. The radial component $V_f \sin \alpha$ is added to the component $V_h \cos \alpha$ generated by the horizontal motion $V_h$, for the larger of these maxima. The smaller maximum, where the wind vector is opposite to the radar beam azimuth, is given by $V_h \cos \alpha - V_f \sin \alpha$. Therefore, $V_h \cos \alpha$ is derived from the average of the two maxima and $V_f \sin \alpha$ is obtained from their difference. Of course, there is always a spectrum of fall velocities due to the particle size distribution; a parameter of this spectrum is also represented by $V_f$.

The methods outlined above prove very useful in the study of air motion. The variability of upper winds can be observed on a relatively small time scale, something that could not be accomplished with other techniques. An accuracy of 0.2 meter per second for speed and a few degrees for direction has been effectively obtained by using a suitable frequency analyzer and display technique. However, these methods were based on observations of patterns as appeared on an oscilloscope, a photograph being taken at each altitude level. Ultimately, each photo had to be analyzed in order to determine wind and vertical fall velocities; furthermore, the various photos had to be integrated to demonstrate the interrelationship of the wind at various altitude levels.

An object of this invention is to provide an improved method of determining wind variability with respect to altitude.

Another object of this invention is to determine wind variability with greater accuracy than has hitherto been obtained.

Another object of this invention is to determine wind variability with much greater speed than has hitherto been obtained.

Another object of this invention is to record atmospheric motion with respect to azimuth and altitude concurrently.

Other objects and features of this invention will become more apparent by reference to the following description taken in conjunction with the accompanying drawings in which:

FIG. 1, a pictorial view of a radar receiving echoes from the atmosphere.

Figure 2:
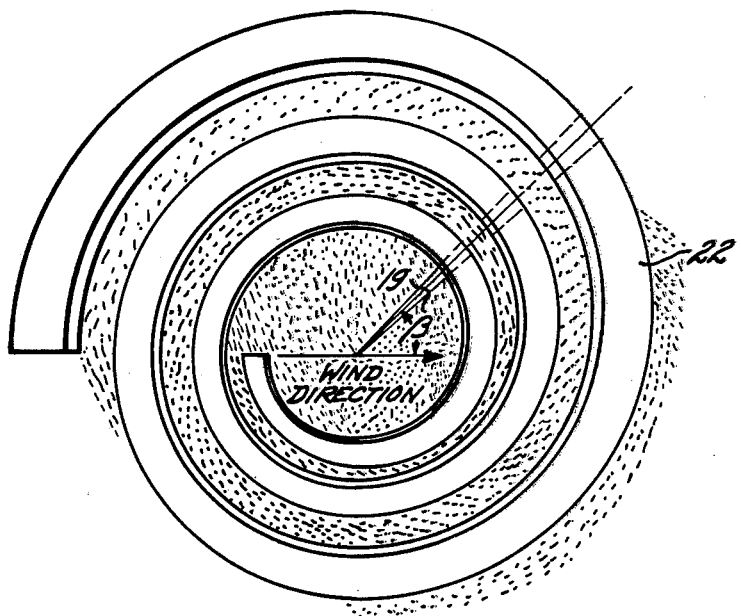

FIG. 2, a sectional view of FIG. 1.

Figure 3:
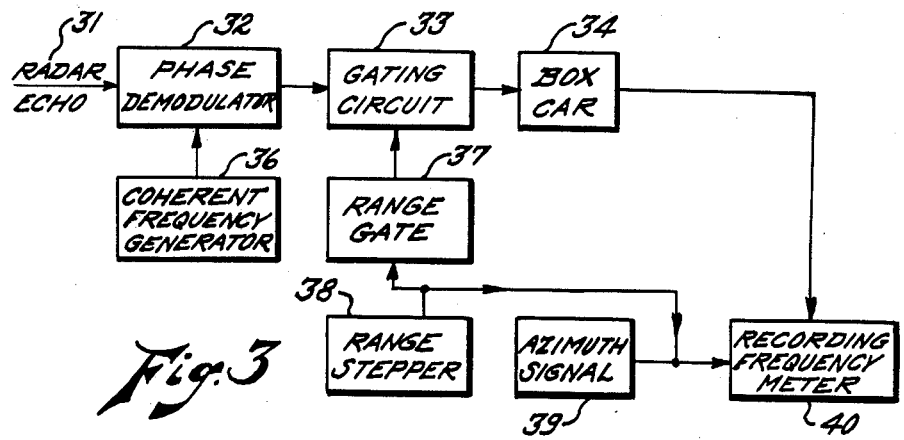

FIG. 3, a block diagram of an embodiment of this invention.

Figure 4:
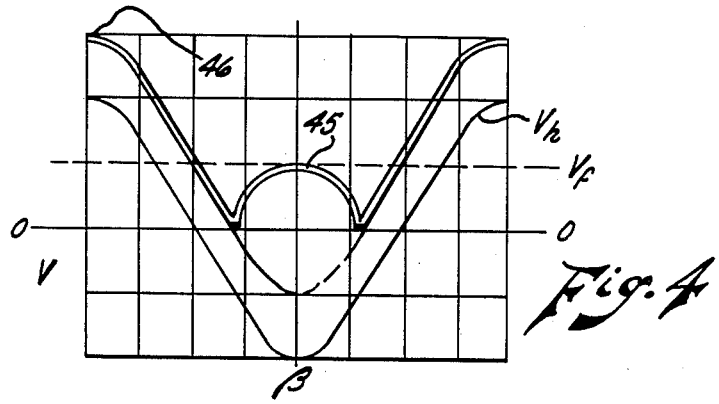

FIG. 4, a display of return signals for one revolution of the antenna.

Figure 5:
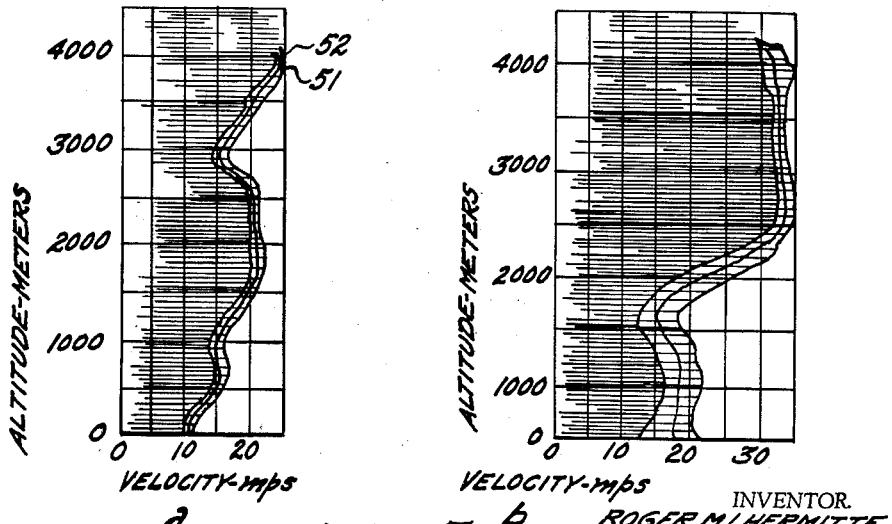

FIG. 5, two displays of wind velocity with reference to varying altitude.

Figure 6:
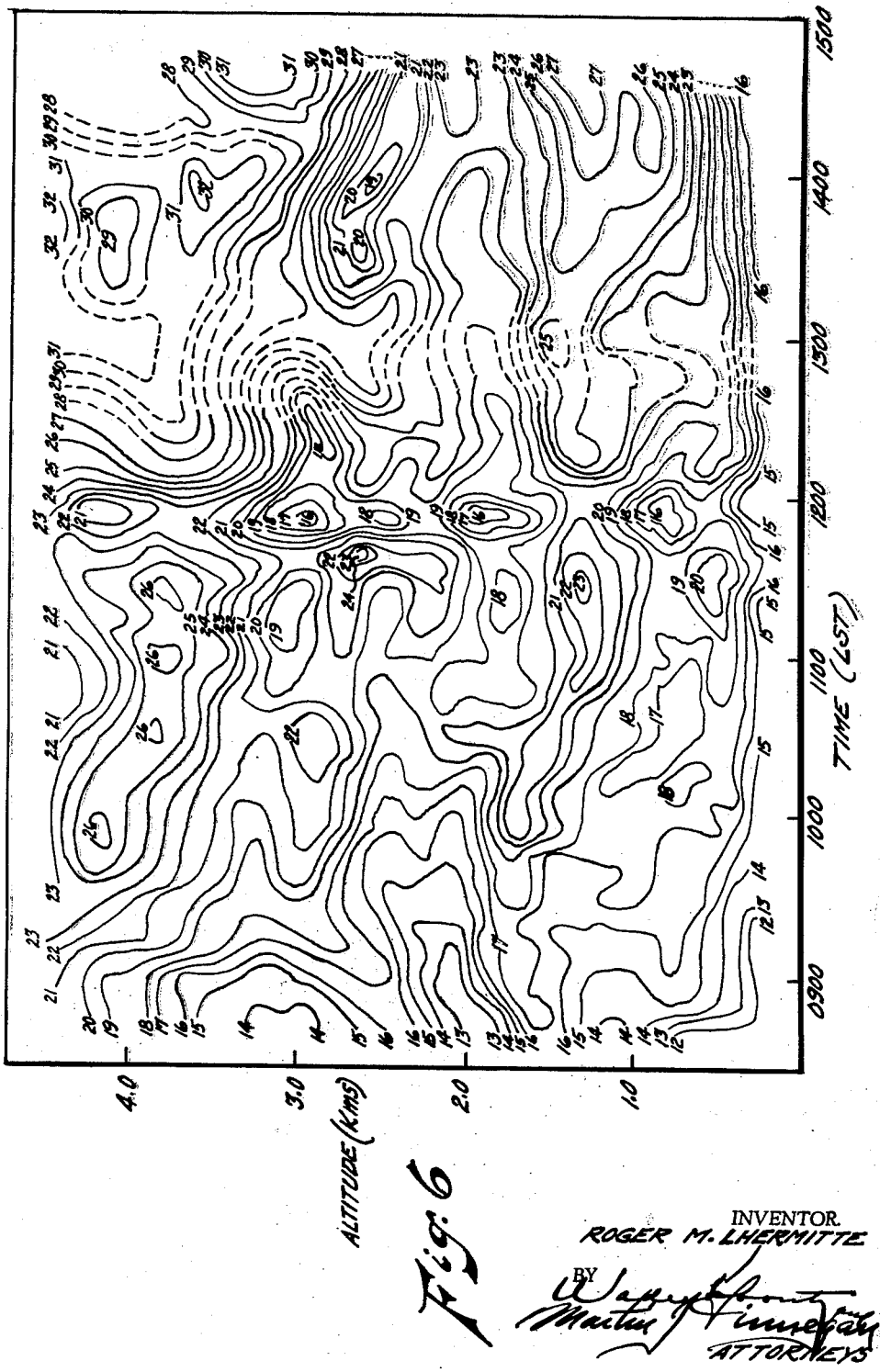

FIG. 6, a plot of wind variability over several hours.

Referring to FIG. 1, radar 13 radiates pulses of energy into the atmosphere. Droplets of moisture within cube in space 21 cause echoes to return to the radar. As the radar rotates in azimuth a continuous series of return echoes supply radar 13 with a fairly continuous signal. By maintaining angle of elevation alpha 12 fixed and merely changing the range gate, as will be explained more fully, phantom spiral 22 will cause continuous signals at progressively higher altitudes to appear at radar 13.

Particles within a discrete volume of space such as 21 will have a spectrum of radial velocities having a central value represented by vector 16 toward the radar. Radial velocity $V16$ is made up of two other vectors $V_f 15$ and $V_h 17$. $V_f$ is due to particles falling to earth such as raindrops. $V_h$ is due to the force of the wind acting on the particles.

The return echoes from radar 13 of FIGURE 1 are utilized in FIGURE 3 so that these radar echoes 31 are applied to phase demodulation 32. Coherent frequency generator 36 also applies a signal to phase demodulator 32 in order to determine the Doppler shift frequency of the return echoes with reference to the coherent frequency.

Output of phase demodulator 32 is applied to gating circuit 33. Here the signal is gated by range gate 37. The angle of elevation of the antenna is fixed; consequently with range gate R determined by signals from range gate 37 only signals from an altitude corresponding to an altitude that is equal to the product of R and sin $\alpha$. Range gate 37 is, in turn, controlled by range stepper 38 such that it is progressively changed causing signals from an ever-increasing altitude to pass. A potentiometer in place of range stepper 38 will provide smooth uniform increase in range.

Output of gating circuit 33 is applied to boxcar 34. Boxcar 34 stretches the applied signal over the interval between signals before applying them to frequency meter 40. A frequency meter is suggested but any device that counts the zero crossings of the time domain signal will be satisfactory.

Azimuth signals from 39 and signals from range stepper 38 are simultaneously applied to recording frequency meter 40 at a common terminal in such a manner that said action produces an advance of the recordation in a vertical mode.

Referring to FIG. 4 a curve having two nulls and two maxima is shown one at 46 and another at 45. This curve represents the frequency content of the signal at boxcar 34 with altitude fixed for one complete revolution of the antenna.

Bearing the above in mind, an examination of FIG. 5a (azimuth is now recorded vertically and velocity or frequency is recorded horizontally) shows that the size of the maxima alternate also. The distance between two large maxima is related to one complete revolution of the antenna as the display in FIG. 4. In addition this distance is related to altitude. The azimuth factor is of such a nature that it does not affect the average value of the altitude and the vertical axis can be calibrated in units of altitude.

FIGS. 5a and 5b represent two different occasions, indicating the variability of wind with increasing altitude. Both 5a and 5b were recorded with the same equipment.

In the above incidents a continuously rotating beam and a slowly moving range gate are used. The time allowed to move 0 to 40,000 feet (which is equivalent to an altitude change from 0 to 20,000 feet with an elevation angle of 30°) is six minutes. During this period, the radar beam completes 60 revolutions in azimuth, providing 60 patterns, each referring to successively higher altitudes. Since the altitude gate is continuously moving, the measurements will be related to the average wind in the altitude interval scanned by the gate during one complete revolution of the antenna. With the equipment used, the altitude change was on the order of the beam cross-section and gate duration vertical component (approximately 120 meters at short range and 250 meters at long range). The smoothing of the wind profile from this scheme is far less than that inherent in other systems such as balloon tracking.

It is to be noted that the spectrum of return signals have a central value as was discussed in greater detail in the previously mentioned copending applications. The frequency meter of this invention responds to this central value and the related spectrum is not reproduced.

Expressing the working principles of the frequency meter mathematically we have as follows:

$$F = (\overline{f^2})^{1/2}$$

where F is the frequency indication on the meter and $f$ is the frequencies encountered in the spectrum of return signals.

$$F = 2\pi/\lambda (\overline{V^2})^{1/2}$$

where $2\pi/\lambda (\overline{V^2})^{1/2}$ has been substituted for $(\overline{f^2})^{1/2}$ and $\lambda$ is the wave length of the signal and $\overline{V^2}$ is the second normalized component of the radial velocity spectrum.

$$F^2 = 4\pi^2/\lambda 2[(\overline{V}_h \cos \alpha + \overline{V}_f \sin \alpha)^2 + \sigma_h^2 \cos^2 \alpha + \sigma_f^2 \sin^2 \alpha]$$

where both sides have been squared and $V_f$ and $V_h$ (vertical and horizontal components of V) have been substituted for V and $V_h$ and $\sigma_h^2$ are the means and variance of the horizontal motion and $\overline{V}_f$ and $\sigma_f^2$ the mean and variance of the vertical motion ($\overline{V}_f$ is positive for one maximum and negative for the other smaller maximum).

The vertical fall variation ($\sigma_f$) is caused chiefly by variations in particle sizes. These variations in our studies indicate an upper limit of 1 m.² sec.⁻² for heavy rain and does not, as will show more fully, materially affect the accuracy of the system.

The horizontal variance on the other hand is more difficult to characterize; however, we know that the frequency meter is fast enough to follow actual variations, and will therefore record $(\overline{V^2})^{1/2}$ as equal to $[\overline{V}^2 + \sigma_t^2]$, where $\sigma_t$ is the total variation including horizontal and vertical variations. In actual tests we have found that $\sigma_t^2$ approximately 9 m.² sec.⁻²; consequently, $(\overline{V^2})^{1/2}$ was approximately 2% less than $[(\overline{V})^2 + \sigma_t^2]^{1/2}$.

In light of the foregoing, we find that $$\sigma_h^2 \cos \alpha + \sigma_f^2 \sin^2 \alpha$$

is so much smaller than $(\overline{V}_h \cos \alpha - \overline{V}_f \sin \alpha)$ that it can be ignored and we will obtain an accuracy of $\pm 0.5$ m. sec.⁻¹ with: $F = 2\pi/\lambda(V_h \cos \alpha \pm \overline{V}_f \sin \alpha)$ which is the reading of the frequency meter.

Referring to FIG. 6, we see a contour map of wind speed variations over a period of approximately six hours. This contour was made from numerous separate records as shown in FIG. 5. Points corresponding to the indicated velocity were picked off at the specified time and transcribed on FIG. 6. The points were then connected together. A completed contour map is a study in wind variation with time and can be used to predict the future course of recorded storms.

While we have described the above principle of our invention in connection with specific apparatus, it is to be clearly understood that this description is only made by way of example and not as a limitation on the scope of our invention as set forth in the objects thereof and in the accompanying claims.

What is claimed is:

1. The system of recordation of variability in atmospheric motion from radar detectable moisture particles in the atmosphere which system includes means including an antenna constantly rotating in azimuth for radiating pulses of energy into the atmosphere, said antenna also having a predetermined constant elevation angle, means for receiving return signal energy from said detectable particles resulting from said radiated pulses, means for deriving from said return signal energy a demodulated signal representative of said detectable particles, means for progressively and incrementally range gating said demodulated signal over a preselected range, means including a boxcar circuit for stretching said gated signal over an interval corresponding to that interval between signals, means for recording the frequency of said stretched signals with respect to azimuth signals from the antenna radiating said pulses of energy together with range gate signals gating said demodulated signals.

2. The system of recordation of variability in atmospheric motion from radar detectable moisture particles in the atmosphere, which system is comprised of means including an antenna constantly rotating in azimuth for radiating pulses of energy into the atmosphere, said antenna also having a constant predetermined elevation angle, means for receiving return echoes from moisture particles within the atmosphere, means for demodulating said return echoes with reference to coherent signals, means for slowly and progressively in range increments gating said demodulated signals over a preselected range, means including a boxcar circuit for stretching the gated signals between intervals between received signals, means for recording the frequency of said stretched signals with respect to azimuth signals from the radar antenna originating said received signals and range gate signals gating said demodulated signals.

3. Apparatus for determining variability in atmospheric motion from radar detectable moisture particles comprising in combination radar transmitting means including an antenna constantly rotating in azimuth and simultaneously having a preselected constant elevation angle, said transmitter means radiating pulses towards said particles, receiving means in receipt of return signals from said particles, phase demodulator means receiving said return signals, coherent frequency means feeding said demodulator means reference signals, a gating circuit, said gating circuit interconnecting said demodulator means and, boxcar means, said gating circuit having applied thereto a slowly moving range gate for a predetermined distance, azimuth signal generating means to provide signal representative of the azimuth position of said antenna, recording means simultaneously receiving the output of said boxcar means and said azimuth means, said recording means recording the central frequency of output of said boxcar with respect to the combined output of said azimuth signal generating means and said gating circuit.

4. As in claim 3 wherein said recording means is a recording frequency meter.

5. As in claim 4 wherein said gating circuit is also connected to a range gate, said range gate being slowly moved in accordance with continuously progressing signal generating means.

6. As in claim 5 wherein a range stepper is used in place of said continuously progressing signal generating means.

References Cited by the Examiner
UNITED STATES PATENTS
2,659,078  11/53  Sherr _____ 343—7.7

CHESTER L. JUSTUS, *Primary Examiner.*